United States Patent
Chouly et al.

(10) Patent No.: US 7,315,582 B2
(45) Date of Patent: Jan. 1, 2008

(54) BACKWARD COMPATIBLE DVB-S STANDARD TRANSMISSION SYSTEM

(75) Inventors: Antoine Chouly, Paris (FR); Olivier Pothier, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 386 days.

(21) Appl. No.: 10/512,624

(22) PCT Filed: Apr. 11, 2003

(86) PCT No.: PCT/IB03/01544
§ 371 (c)(1),
(2), (4) Date: Oct. 26, 2004

(87) PCT Pub. No.: WO03/094520
PCT Pub. Date: Nov. 13, 2003

(65) Prior Publication Data
US 2005/0169400 A1    Aug. 4, 2005

(30) Foreign Application Priority Data
Apr. 30, 2002  (EP) .................................. 02291087

(51) Int. Cl.
*H04L 27/20* (2006.01)
(52) U.S. Cl. ................. 375/308; 375/295; 375/302
(58) Field of Classification Search ........... 375/295, 375/302
See application file for complete search history.

(56) References Cited

U.S. PATENT DOCUMENTS

| | | | | |
|---|---|---|---|---|
| 5,305,352 A * | 4/1994 | Calderbank et al. | ........ | 375/261 |
| 5,398,237 A * | 3/1995 | Eyer et al. | .......... | 370/206 |
| 5,479,448 A * | 12/1995 | Seshadri | .......... | 375/267 |
| 6,674,811 B1 * | 1/2004 | Desrosiers et al. | ........ | 375/298 |
| 6,760,388 B2 * | 7/2004 | Ketchum et al. | .......... | 375/295 |
| 6,947,490 B1 * | 9/2005 | Edwards et al. | .......... | 375/261 |
| 6,954,505 B2 * | 10/2005 | Gatherer et al. | .......... | 375/260 |
| 2003/0072386 A1* | 4/2003 | Ionescu | ........ | 375/295 |
| 2005/0157811 A1* | 7/2005 | Bjerke et al. | .......... | 375/267 |
| 2005/0271167 A1* | 12/2005 | Betts | .......... | 375/341 |
| 2006/0153315 A1* | 7/2006 | Chen et al. | .......... | 375/295 |

OTHER PUBLICATIONS

A. Morello and V. Mignone, entitled "Backward compatible solutions for DVB-S2", DVB Technical module, TM2638. pp. 1-10, Feb. 2002.

* cited by examiner

*Primary Examiner*—David C. Payne
*Assistant Examiner*—Leon-Viet Q Nguyen
(74) *Attorney, Agent, or Firm*—Paul Im

(57) ABSTRACT

The invention relates to digital transmissions. It particularly relates to a new transmission system (DVB-S2), which is backward compatible with a primary transmission system (DVB-S), enabling a receiver of the primary system to receive signals transmitted by a transmitter of the new transmission system. The principle of the invention is based on using a hybrid QPSK/Non-Uniform 8-PSK modulation. The hybrid modulation is specified by a periodic binary pattern indicating, for each symbol, which modulation is used.

7 Claims, 2 Drawing Sheets

US 7,315,582 B2

BACKWARD COMPATIBLE DVB-S STANDARD TRANSMISSION SYSTEM

FIELD OF THE INVENTION

The invention relates to digital transmissions. It particularly relates to a new transmission system, which is backward compatible with a primary transmission system. The invention enables a receiver of the primary system, using a primary modulation for coding signals to be transmitted though a transmission channel, to receive signals encoded in accordance with a new transmission system using a secondary modulation.

It applies to digital transmission systems, and particularly to satellite broadcasting systems for digital television.

BACKGROUND ART

The technical module (TM) of the DVB (Digital Video Broadcast) committee is investigating the definition of a second-generation system for satellite broadcasting (DVB-S2) in order to increase the bit rate and the power efficiency in future satellite broadcast systems. Two main approaches for coding and modulation are considered. The first one is totally incompatible with the current DVB-S (Digital Video Broadcasting for Satellite) standard including e.g. turbo coding with high spectral efficient modulations, while the second one is backward compatible.

The article by A. Morello and V. Mignone, entitled "Backward compatible solutions for DVB-S2", DVB Technical module, TM2638, describes a backward compatible system with which additional data rate can be provided by using the hierarchical Non-Uniform 8-PSK (8 states—Phase Shift Keying) modulation instead of the classical QPSK (Quadrature Phase Shift Keying) modulation. A problem of such a system using the hierarchical non-uniform 8-PSK modulation is that the angle between the symbols in the non-uniform 8-PSK signal constellation must be kept rather small ($<\pi/8$) because this angle deviation introduced by the hierarchical constellation will be considered as an additional noise factor by the classical QPSK demodulator at the receiver side. Hence, the minimum distance of the non-uniform constellation stays rather small. Consequently, the additional data must be protected with a powerful and low-rate channel coding scheme. This necessitates a rather complex algorithm to decode the additional data.

OBJECT AND SUMMARY OF THE INVENTION

It is an object of the invention to provide a system, which circumvents the drawbacks mentioned above.

A transmitter according to the invention comprises:

a primary encoder for receiving a primary stream containing data and for supplying an n-bit per symbol time encoded stream, a secondary encoder for encoding a secondary stream containing additional data and for supplying an m-bit per symbol time encoded stream, a hybrid modulator (40) for receiving either the primary n-bit per symbol time encoded stream or both encoded streams, and for generating either an n-bit symbol of a first constellation or an n+m-bit symbol of a second constellation in accordance with a predetermined pattern indicating, for each symbol time, which constellation is to be applied.

The secondary constellation contains more signals ($2^{n+m}$) than the primary constellation ($2^n$), to be able to transmit additional data. The receivers of the primary system, expecting only signals of the primary constellation, consider signals of the secondary constellation as signals of the first constellation affected by noise. The gist of the invention is to apply the secondary constellation alternately with the primary constellation, in accordance with a predetermined pattern, depending on the transmitted streams. The decoder, which expects signals of the primary constellation, called the primary decoder, has thus more capacity to decode the signals of the secondary constellation, because it receives alternately symbols of the primary constellation, which are considered as less affected by noise.

This allows an increase of the distance between the symbols of the secondary constellation, which renders the channel coding scheme design of the secondary stream easier and the decoding operations at the receiver side less complex.

Advantageously, the proposed transmitter also leads to a better synchronization between the transmitter and the receiver, which expects symbols of the primary constellation, called primary receiver. The primary receiver periodically receives true primary symbols, which are easy to decode and renders synchronization easier. Moreover, the quantization can be performed with less precision, because the distance between the symbols of the secondary constellation is larger.

BRIEF DESCRIPTION OF THE DRAWINGS

The invention and additional features, which may be optionally used to implement the invention to advantage, are apparent from and will be elucidated with reference to the drawings described hereinafter.

DETAILED DESCRIPTION OF THE DRAWINGS

The following remarks relate to reference signs. Same block labels in two distinct Figures usually indicate the same functional entities.

Figure 1:
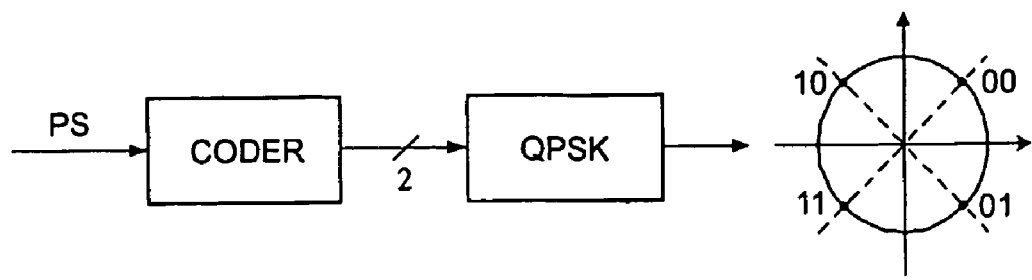
FIG. 1 is a conceptual diagram illustrating basic features of a general block diagram of a DVB-S base-band transmitter.

FIG. 1 shows the block diagram of a regular DVB-S base-band transmitter. It comprises a channel encoder, denoted CODER, and a QPSK modulator, denoted QPSK. The channel encoder CODER receives a primary data stream, denoted PS, and supplies an encoded stream including redundancy bits intended to protect the transmitted data stream from transmission errors. The channel encoder CODER generally consists of the concatenation of a Reed Solomon code with a punctured rate-½ convolutional code. During each symbol, two bits at the channel encoder output allow selection of one of the four QPSK symbols in accordance with Gray mapping, which is illustrated by a 2-bit symbol, among the set (00, 01, 11, 10), in each of the four quadrants of a circle. Then the 2-bit symbol is transmitted via a transmission channel to a receiver (not shown) comprising a QPSK demodulator and a channel decoder for performing inverse operations with respect to the operations performed by the transmitter and for retrieving the transmitted data stream PS.

Figure 2:
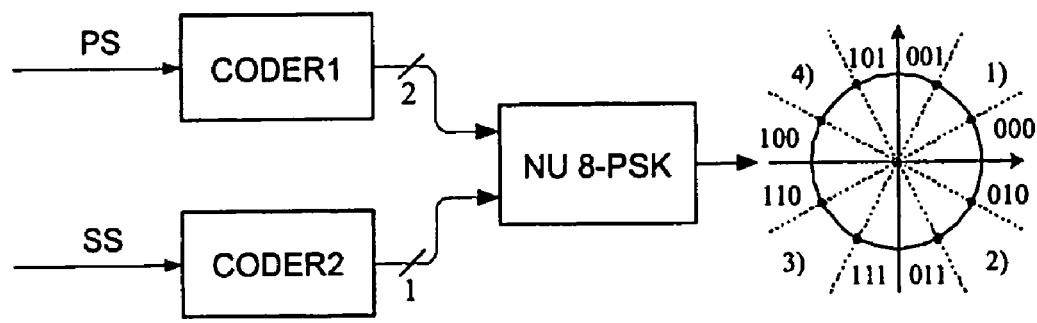
FIG. 2 is a conceptual diagram illustrating basic features of a prior art backward compatible transmitter using non-uniform 8-PSK modulation.
Figure 3:
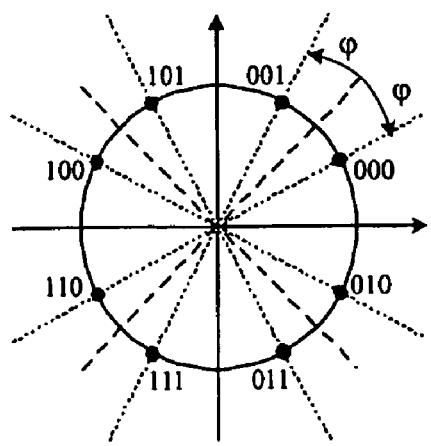
FIG. 3 is a schematic diagram showing the non-uniform 8-PSK signal constellation in accordance with the prior art.

FIG. 2 represents the transmission structure of a backward compatible system, called DVB-S2, using the hierarchical non-uniform 8-PSK modulation illustrated in FIG. 3. The transmitter is compatible with DVB-S and DVB-S2 receivers. It comprises:

a first channel encoder, denoted CODER 1, for receiving a first DVB stream, called primary stream and denoted PS, and for supplying at each symbol time an n-bit output (n=2 in the embodiment illustrated in FIG. 2) corresponding to one quadrant of the QPSK mapping: the first quadrant, indicated 1) in FIG. 2, corresponding to the pair of bits (0,0), the second quadrant, indicated 2), corresponding to the pair (0,1), the third quadrant, indicated 3), corresponding to the pair (1,1) and the fourth quadrant, indicated 4), corresponding to the pair (1,0), a second channel encoder, denoted CODER2, for receiving a second stream called secondary stream and denoted SS, whose aim is to provide additional data rate, and for delivering, at each symbol time, an m-bit output (with m=1 here) corresponding to one of the two Non-Uniform 8-PSK symbols located in the quadrant already selected by the 2-bit output produced from the primary stream by the first channel encoder, a Hierarchical Non-Uniform 8-PSK modulator, denoted NU 8-PSK, for delivering a Non-Uniform 8-PSK symbol to be received either by a regular DVB-S receiver or by a DVB-S2 receiver via a transmission channel.

The primary stream PS provides the possibility of maintaining the compatibility with the DVB-S system. Consequently, the first channel encoder CODER1 is identical to a regular DVB-S channel encoder.

The mapping of the Non-Uniform 8-PSK constellation is illustrated in FIG. 3. The modulation is characterized by the angle 2φ between the symbols in the same quadrant, which is rather small (<π/8).

At the receiver side, the demodulation is performed as follows. The primary data is decoded in the same way as in the DVB-S receiver, i.e. by computing metrics relative to QPSK symbols. This leads to SNR degradation with respect to the DVB-S system, which depends on the value of φ. Consequently, φ is chosen to be such that the corresponding SNR degradation will not exceed a fixed value (e.g. 0.5 dB). For this classical QPSK demodulator, the angle deviation introduced by the hierarchical constellation is considered as an additional noise factor. The secondary stream is decoded by considering metrics with respect to the 8 constellation symbols. For a given code, the BER (Bit Error Rate) performance of this stream depends on the minimum Euclidean distance of the constellation, which equals 2 sin (φ).

Figure 4:
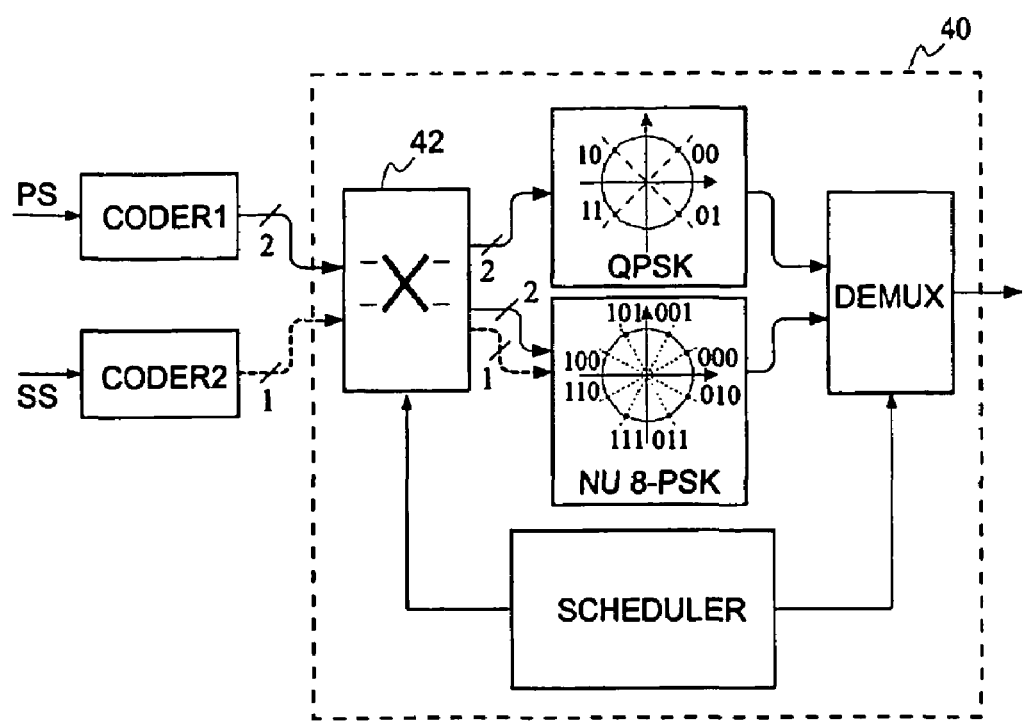
FIG. 4 is a conceptual diagram illustrating basic features of a backward compatible transmitter using hybrid QPSK/Hierarchical non-uniform 8-PSK modulation according to the invention.

FIG. 4 illustrates a block diagram of an example of a transmitter according to the invention. It comprises a first encoder CODER1, a second encoder CODER2 and a hybrid QPSK/Hierarchical Non-Uniform 8-PSK modulator 40. The primary encoder (CODER1) receives a primary stream containing data and delivers an n-bit encoded stream. The secondary encoder (CODER2) encodes a secondary stream containing additional data and delivers an m-bit encoded stream. The hybrid modulator (40) receives either the primary n-bit encoded stream or both encoded streams and generates either an n-bit symbol of a first constellation (e.g. QPSK), called primary symbol, or an n+m-bit symbol of a second constellation (e.g. NU 8-PSK), called secondary symbol, in accordance with a predetermined pattern indicating, for each symbol duration, which constellation is to be applied. The pattern is predetermined with respect to the required rates of transmitted streams and the permitted SNR degradation on the primary stream.

An advantage of such a hybrid modulator as compared with the modulator of FIG. 2 is that it transmits true primary symbols alternately with secondary symbols. The primary decoder has thus more capacity to decode the received signal, because part of the received symbols correspond to emitted symbols that belong to the primary constellation.

This allows an increase of the distance between the symbols of the secondary constellation, which renders the channel coding design of the secondary stream and decoding operations easier at the receiver side.

The modulator 40 may e.g. comprise a switch 42, a QPSK modulator, denoted QPSK, a hierarchical non-uniform 8-PSK modulator, denoted NU 8-PSK, a hybrid modulation de-multiplexer, denoted DEMUX, and a hybrid QPSK/Hierarchical Non-Uniform 8-PSK modulator scheduler, denoted SCHEDULER.

The principle of the invention is based on using a hybrid QPSK/Non-Uniform 8-PSK modulation. The hybrid modulation is specified by a periodic binary pattern, entered into the scheduler, to indicate the constellation used for each symbol. As an example, if we assign the bit "0" to the QPSK constellation and the bit "1" to the hierarchical constellation, then the pattern (0,1,1) means that a QPSK symbol is transmitted every 3 symbol periods. Depending on the value of the periodic pattern, the scheduler SCHEDULER controls the Hybrid modulation switch 42 and the Hybrid modulation de-multiplexer DEMUX as follows. If, at the considered symbol time, the periodic pattern is "1", the switch 42 takes two coded bits from the primary stream and one coded bit from the secondary stream. These three bits are passed to the Hierarchical NU-8-PSK modulator to generate a NU-8-PSK 3-bit symbol. If, at the considered symbol time, the periodic pattern is "0", the switch takes two coded bits from the primary stream. These two bits are passed to the QPSK modulator to generate a 2-bit QPSK symbol. The role of the Hybrid modulation de-multiplexer is to pass the generated symbols to the output of the modulator: if the periodic pattern is "1"

("0" respectively), it passes the corresponding generated Hierarchical NU-8-PSK (respectively QPSK) symbol to the output.

The main advantages of the invention as compared with conventional (non-hybrid) hierarchical schemes are the following. For a given performance of the primary stream (e.g. BER=2.10-4 at the output of the Viterbi decoder), the angle φ of the Non-Uniform 8-PSK constellation (and hence its minimal Euclidian distance) can be increased with respect to the non-hybrid scheme, due to the presence of QPSK (non-"noisy") symbols. The secondary channel encoder complexity is reduced because higher rate codes can be employed to achieve the same spectral efficiency as the non hybrid scheme. Indeed, considering the secondary stream, the SNR loss due to the use of higher rate codes is compensated by the gain in squared minimum Euclidean distance due to the angle φ increase. Moreover, since the minimum distance between two Non Uniform symbols is increased, the quantification can be done with fewer bits. Lastly, the use of a hybrid modulation allows the use of QPSK symbols for the synchronization (e.g. carrier and time recoveries). This leads to a performance improvement with respect to non-hybrid systems for DVB-S2 receivers, due to lower phase jitter.

Simulations have been performed in order to compare the performances between hybrid and non-hybrid modulations. As an example, a modulation pattern=(0,1,1) was used, i.e., one QPSK and two NU-8-PSK symbols are transmitted periodically. A ½ Rate convolutional code was used for the primary data stream with a target Bit Error Rate BER=2.10-4. We obtained a minimum angle ϕ=0.30 rad in the case of hybrid modulation compared to ϕ=0.23 rad in the case of hybrid modulation, resulting in a gain of 2.25 dB in terms of minimum distance of the secondary stream. Since the SNR loss due to the decrease of the spectral efficiency (because the secondary code rate is doubled) is equal to 1.76 dB, the overall SNR gain for the secondary stream is equal to 0.49 dB.

Figure 5:
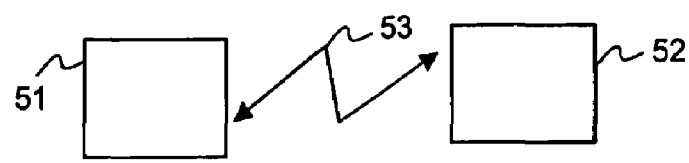
FIG. 5 is a conceptual diagram illustrating a system according to the invention.

FIG. 5 illustrates a backward compatible system according to the invention. It comprises a transmitter 51, which is backward compatible like the transmitter described with reference to FIG. 4, a receiver 52 and a transmission channel 53 for transmitting modulated data from the transmitter to the receiver. The receiver 52 may be a regular receiver, e.g. of the DVB-S type, expecting primary symbols (coded in accordance with the QPSK modulation) or a new receiver, e.g. of the DVB-S2 type, for receiving primary and secondary symbols (coded in accordance with the QPSK and NU 8-PSK modulations, alternately in accordance with a predetermined pattern).

In the case of a regular primary receiver, the receiver will receive the primary (QPSK) symbols as usual, and decode them as usual, and will receive the secondary symbols (NU-8PSK), which will be considered as noisy primary symbols, and will decode them as primary symbols.

In the case of a new receiver, to be able to properly decode the received signals, the receiver must comprise means for detecting the pattern used by the hybrid modulator, and e.g. the minimum Euclidian distance between symbols or the angle between symbols characterizing the modulation used by the transmitter. By detecting the noisiest symbols, the receiver should be able to find which periodic pattern is used in a blind manner. The angle or the distance between symbols can be detected by averaging the angles or distances between the received symbols. A demodulator performing inverse operations with respect to the primary modulator used in the transmitter for coding the modulated (QPSK) symbols will then demodulate the primary symbols (QPSK). A specific demodulator performing inverse operations with respect to the secondary modulator used in the transmitter will demodulate the secondary symbols (NU 8-PSK, ϕ).

The drawings and their description hereinbefore illustrate rather than limit the invention. It will be evident that there are numerous alternatives, which fall within the scope of the appended claims. In this respect, the following closing remarks are made.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software, or both carries out a function.

Although, a hybrid QPSK/NU 8-PSK modulator is described in FIG. 4, this does not limit the invention to these 2 modulations only. The invention is also applicable to other pairs of modulations, as well as to other primary and secondary types of streams, not necessarily compatible with the DVB standard.

Any reference sign in a claim should not be construed as limiting the claim. Use of the verb "to comprise" and its conjugations does not exclude the presence of elements or steps other than those stated in a claim. Use of the article "a" or "an" preceding an element or step does not exclude the presence of a plurality of such elements or steps.

The invention claimed is:

1. A transmitter comprising: a primary encoder (CODER1) for receiving a primary stream containing data and for supplying a primary encoded stream, a secondary encoder (CODER2) for encoding a secondary stream containing additional data and for supplying a secondary encoded stream, a hybrid modulator (40) for receiving either the primary encoded stream or both primary and secondary encoded streams, and for generating either n-bit symbols of a first constellation or n+m-bit symbols of a second constellation in accordance with a predetermined pattern indicating, for each symbol duration, which constellation is to be applied;

wherein the hybrid modulator (40) comprises: switching means (42) allowing selection of n-bit sequences from the primary encoded stream and/or m-bit sequences from the secondary encoded stream, with respect to a predetermined pattern, a first modulator (QPSK) for receiving said n-bit sequences from the switching means (42) and for generating n-bit symbols of the first constellation, a second modulator for receiving both n-bit sequences and m-bit signals from the switching means (42) and for generating n+m-bit symbols of the second constellation, a de-multiplexer (DEMUX) for de-multiplexing the symbols generated by said first and second modulators, control means for controlling the switching means and the de-multiplexer with respect to the predetermined pattern, in order that: if the predetermined pattern indicates that the first constellation is to be applied, an n-bit sequence is passed from the switching means (42) to the first modulator for generating an n-bit symbol to be supplied at the output of the de-multiplexer (DEMUX), if the predetermined pattern indicates that the second constellation is to be applied, an n-bit sequence and an m-bit sequence are passed from the switching means (42) to the second modulator for generating an n+m-bit symbol to be supplied at the output of the de-multiplexer (DEMUX).

2. A transmission method comprising: a primary encoding step (CODER1) for receiving a primary stream containing data and for supplying a primary encoded stream, a secondary encoding step (CODER2) for encoding a secondary stream containing additional data and for supplying a secondary encoded stream, a hybrid modulation step (40) for receiving either the primary encoded stream or both primary and secondary encoded streams, and for generating either n-bit symbols of a first constellation or n+m-bit symbols of a second constellation in accordance with a predetermined pattern indicating, for each symbol duration, which constellation is to be applied;

wherein the hybrid modulation step comprises: a switching step allowing selection of n-bit sequences from the primary encoded stream and/or m-bit sequences from the secondary encoded stream, with respect to a predetermined pattern, a first modulation step for receiving said n-bit sequences from the switching step and for generating n-bit symbols of the first constellation, a second modulation step for receiving both n-bit sequences and m-bit signals from the switching step and for generating n+m-bit symbols of the second constellation, a de-multiplexing step for de-multiplexing the symbols generated by said first and second modulation steps, a control step for controlling the switching step and the de-multiplexing step with respect to the predetermined pattern, in order that: if the predetermined pattern indicates that the first constellation is to be applied, an n-bit sequence is passed from the switching step to the first modulation step for generating an n-bit symbol to be supplied at the output of the de-multiplexing step, if the predetermined pattern indicates that the second constellation is to be applied, an n-bit sequence and an m-bit sequence are passed from the switching step to the second modulation step for generating an n+m-bit symbol to be supplied at the output of the de-multiplexing step.

3. A receiver for receiving symbols transmitted from a transmitter as claimed in claim 1, wherein said received symbols are coded in accordance with a primary or a secondary constellation, the secondary constellation being characterized by a specific parameter indicating a distance between symbols of the constellation, the receiver comprising: means for detecting the predetermined pattern used by the transmitter indicating, for each symbol duration, which constellation among the primary or the secondary constellation is used, means for detecting the specific parameter of the secondary constellation, and decoding means for decoding the received symbols in accordance with the constellation used, as indicated by the pattern, taking into account the detected parameter for the secondary constellation.

4. A reception method for receiving symbols as transmitted in step 2, the method comprising: a reception step for receiving symbols coded in accordance with a primary or a secondary constellation, the secondary constellation being characterized by a specific parameter indicating a distance between symbols of the constellation, a first detection step for detecting a predetermined pattern used by the transmitter for indicating, for each symbol duration, which type of constellation among the primary or the secondary constellation is used, a second detecting step for detecting the specific parameter of the secondary constellation, and a decoding step for decoding the received symbols in accordance with the type of constellation used, as indicated by the pattern, taking into account the detected parameter of the secondary constellation for determining the distance between the symbols of the secondary constellation.

5. A system comprising a transmitter as claimed in claim 1 and a receiver as claimed in claim 3.

6. A computer program, stored on a computer readable medium, for a receiver computing a set of instructions, which, when loaded into the receiver, causes the receiver to carry out the method as claimed in claim 4.

7. A computer program product, stored on a computer readable medium, for a transmitter computing a set of instructions, which, when loaded into the transmitter, causes the transmitter to carry out the method as claimed in claim 2.

* * * * *